(12) United States Patent
Lu et al.

(10) Patent No.: US 8,508,581 B2
(45) Date of Patent: Aug. 13, 2013

(54) PIXEL DATA TRANSFORMATION METHOD AND APPARATUS FOR THREE DIMENSIONAL DISPLAY

(75) Inventors: Wei-Zheng Lu, Chiayi (TW); Hsin-Han Shen, Taipei County (TW); Ji-Da Chen, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 466 days.

(21) Appl. No.: 12/861,838

(22) Filed: Aug. 24, 2010

(65) Prior Publication Data

US 2011/0102543 A1    May 5, 2011

Related U.S. Application Data

(60) Provisional application No. 61/255,857, filed on Oct. 29, 2009.

(30) Foreign Application Priority Data

Dec. 31, 2009   (TW) ................................ 98146178 A

(51) Int. Cl.
*H04N 13/00* (2006.01)
(52) U.S. Cl.
USPC ............................................. 348/43; 348/51
(58) Field of Classification Search
None
See application file for complete search history.

(56) References Cited

U.S. PATENT DOCUMENTS

| | | | | |
|---|---|---|---|---|
| 5,493,339 | A | * | 2/1996 | Birch et al. .................... 348/461 |
| 6,108,029 | A | | 8/2000 | Lo |
| 6,738,518 | B1 | * | 5/2004 | Minka et al. ................... 382/218 |
| 7,119,762 | B2 | | 10/2006 | Price et al. |
| 2002/0122044 | A1 | * | 9/2002 | Deering ......................... 345/597 |
| 2005/0140676 | A1 | | 6/2005 | Cho |
| 2008/0104374 | A1 | * | 5/2008 | Mohamed ....................... 712/220 |

FOREIGN PATENT DOCUMENTS

| | | |
|---|---|---|
| TW | 200426672 | 12/2004 |
| TW | 200524431 | 7/2005 |
| TW | 200928860 | 7/2009 |

OTHER PUBLICATIONS

"Office Action of Taiwan counterpart application" issued on Oct. 23, 2012, p. 1-p. 5, in which the listed references were cited.

* cited by examiner

*Primary Examiner* — Joseph Ustaris
*Assistant Examiner* — Jill Sechser
(74) *Attorney, Agent, or Firm* — Jianq Chyun IP Office

(57) ABSTRACT

A pixel data transformation method that can improve the display quality of a text image in a multi-view autostereoscopic display apparatus is provided. The pixel data transformation method includes following steps. The color values of a first and a second original pixels adjacent to each other are obtained. The first and the second original pixels are replaced respectively with a first and a second pixel arrays according to the color value of the first and the second original pixels. Edge pixels on adjoining sides of the first and the second pixel arrays are combined, wherein a color value of each of the combined pixels is a sum of color values of the two corresponding edge pixels on adjoining sides of the first and the second pixel arrays.

21 Claims, 5 Drawing Sheets

| [a,b,c] | [0,0,0] |
| [0,b,c] | [a,0,0] |
| [0,0,c] | [a,b,0] |

330

| [e,f,g] | [0,0,0] |
| [0,f,g] | [e,0,0] |
| [0,0,g] | [e,f,0] |

| [a,b,c] | [e,f,g] | [0,0,0] |
| [0,b,c] | [a,f,g] | [e,0,0] |
| [0,0,c] | [a,b,g] | [e,f,0] |

PIXEL DATA TRANSFORMATION METHOD AND APPARATUS FOR THREE DIMENSIONAL DISPLAY

CROSS-REFERENCE TO RELATED APPLICATION

This application claims the priority benefit of U.S. provisional application Ser. No. 61/255,857, filed on Oct. 29, 2009 and Taiwan application serial no. 98146178, filed on Dec. 31, 2009. The entirety of each of the above-mentioned patent applications is hereby incorporated by reference herein and made a part of specification.

BACKGROUND OF THE INVENTION

1. Field of the Invention

The present invention generally relates to a three dimensional (3D) display, and more particularly, to a pixel data transformation method and a pixel data transformation apparatus for a multi-view autostereoscopic display apparatus.

2. Description of Related Art

Three dimensional (3D) television is one of today's most promising displays. A 3D television includes a 3D display and 3D films. For playing a 3D film, images shot from different angles are composed according to the characteristic of the 3D display. An existing 3D film may be composed of images shot from 2 angles to 9 angles. Presently, the display quality of text images in a 3D film played by a naked-eye 3D display is not very satisfactory. If a subtitle is directly displayed on the screen through a conventional technique, incorrect color of the subtitle or a rainbow-like display may be produced or the user may even not be able to see some fine lines in the text due to the parallax barrier or the lenticular screen of the 3D display.

SUMMARY OF THE INVENTION

Accordingly, the present invention is directed to a pixel data transformation method and a pixel data transformation apparatus for a three dimensional (3D) display, wherein the color of a text can be correctly displayed in the 3D display and rainbow-like display on the screen can be avoided.

According to an embodiment of the present invention, a pixel data transformation method for a 3D display is provided. The pixel data transformation method includes following steps. A color value of a first original pixel is obtained. The first original pixel is replaced with a first pixel array according to the color value of the first original pixel. A color value of a second original pixel is obtained. The second original pixel is adjacent to the first original pixel. The second original pixel is replaced with a second pixel array according to the color value of the second original pixel. Edge pixels on adjoining sides of the first pixel array and the second pixel array are combined, wherein a color value of each of the combined pixels is a sum of color values of the two corresponding edge pixels on adjoining sides of the first pixel array and the second pixel array.

According to an embodiment of the present invention, a computer program for the pixel data transformation of a 3D display is provided. The computer program executes the pixel data transformation method described above when the computer program is loaded into a computer and executed by the same.

According to an embodiment of the present invention, a 3D video data processing apparatus includes a 3D video processor, a text processor, and a combination circuit. The 3D video processor provides a 3D video frame. The text processor transforms an original text into an extensible text. The combination circuit is respectively coupled to the 3D video processor and the text processor and combines the extensible text into the 3D video frame. The method for the text processor to transform the original text includes the pixel data transformation method described above.

As described above, in embodiments of the present invention, each pixel in an original text is respectively replaced with a corresponding pixel array so that the text display quality of a multi-view autostereoscopic display apparatus can be improved. In embodiments of the present invention, no 2D/3D switching is adopted so that the optical structure of the 3D display needs not to be changed and the complicated switching control circuit is omitted. In embodiments of the present invention, special pixel permutation and combination are adopted such that the text strokes can show a correct color from every viewing angle.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 3A-3C illustrate how a text processor in FIG. 1 transforms an original text into an extensible text according to an embodiment of the present invention.

DESCRIPTION OF THE EMBODIMENTS

Figure 1:
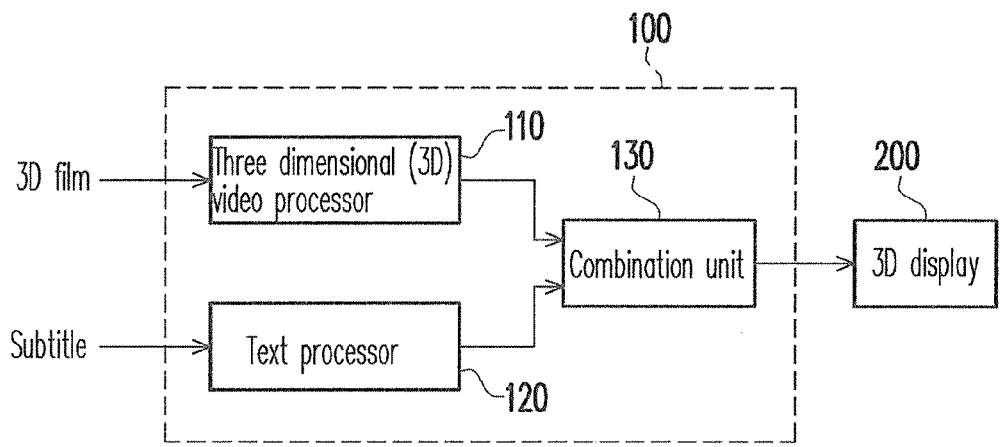
FIG. 1 is a schematic block diagram of a three dimensional (3D) video data processing apparatus according to the present invention.

Reference will now be made in detail to the present preferred embodiments of the invention, examples of which are illustrated in the accompanying drawings. Wherever possible, the same reference numbers are used in the drawings and the description to refer to the same or like parts.

In a multi-view autostereoscopic three dimensional (3D) display, a parallax barrier or a lenticular screen, both are so-called image splitter, is adopted for blocking or refracting light entering sub-pixels so that one third of the original pixel can be seen from one specific viewing angle. When text strokes are displayed by each pixel which is as the smallest unit, a user can see one of the red, blue, and green sub-pixels in each pixel. As a result, color error or a rainbow-like display is produced. In most cases, each text stroke, especially each transverse stroke, has the width of a single pixel. A transverse stroke may even be invisible from a specific viewing angle.

When a text is displayed on a naked-eye 3D screen through a conventional technique, the display quality of the text is not so satisfactory (for example, with low resolution and color error) due to the characteristic of the 3D screen. Accordingly, when a 3D film is played on the naked-eye 3D screen, the subtitle cannot be clearly displayed. Below, a technique for improving the display quality of text on a naked-eye 3D screen will be described with reference to embodiments of the present invention.

FIG. 1 is a schematic block diagram of a 3D video data processing apparatus 100 according to the present invention. Referring to FIG. 1, the 3D video data processing apparatus 100 includes a 3D video processor 110, a text processor 120, and a combination circuit 130. The 3D video processor 110 receives and processes a 3D film and provides a 3D video frame to the combination circuit 130. Herein the 3D video processor 110 may process the 3D film through a specific algorithm, and the algorithm for processing the 3D film should be well known by those skilled in the art therefore will not be described herein.

The text processor 120 transforms the subtitle (original text) of foregoing 3D film into an extensible text and outputs the extensible text to the combination circuit 130. The combination circuit 130 is respectively coupled to the 3D video processor 110 and the text processor 120. The combination circuit 130 combines the extensible text provided by the text processor 120 into the 3D video frame output by the 3D video processor 110 and transmits the combined frame to a 3D display 200. The 3D display 200 may be a parallax barrier display, a lenticular screen display, or other types of 3D display. In the following embodiments, the pixel data transformation method is illustrating by implementing with a parallax barrier display.

Figure 2:
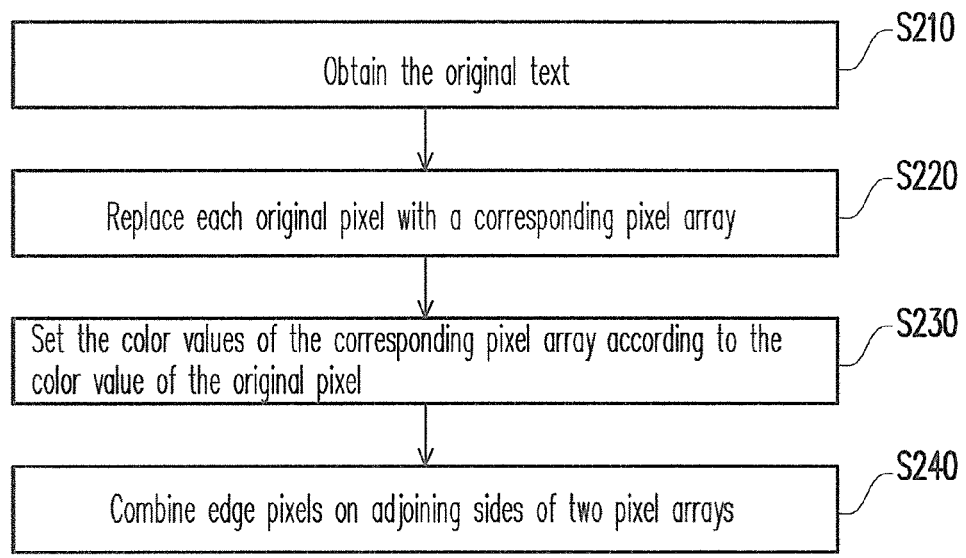
FIG. 2 illustrates a pixel data transformation method for a 3D display according to an embodiment of the present invention.

The pixel data transformation method adopted by the text processor 120 will be described herein. FIG. 2 illustrates a pixel data transformation method for a 3D display according to an embodiment of the present invention. Referring to FIG. 2, in step S210, the text processor 120 obtains an original text, wherein the original text is composed of a plurality of original pixels. The technique of obtaining the original text in step S210 is not limited in the present embodiment. For example, in step S210, a lattice word or a vector word may be processed by using a font render in the text processor 120. The font render transforms a binary data (for the lattice word) or an equation (for the vector word) into an original text composed of pixels that are arranged in a two dimensional array. The original text is usually in a single color, and the edges thereof show different shades (brightness values).

FIGS. 3A-3C illustrate how the text processor 120 in FIG. 1 transforms an original text into an extensible text according to an embodiment of the present invention. Two original pixels 310 and 320 in the original text are illustrated in FIG. 3A, and other original pixels in the original text can be referred to the description of FIGS. 3A-3C therefore will not be described herein. The second original pixel 320 is adjacent to the first original pixel 310.

The color values of the original pixels 310 and 320 in FIG. 3A are respectively [a, b, c] and [e, f, g]. In the present embodiment, [a, b, c] indicates that the red value, green value, and blue value of the original pixel 310 are respectively a, b, and c. However, the present invention is not limited herein, and in other embodiments, [a, b, c] may also represent [green value, red value, blue value], [blue value, red value, green value], or other color values.

Next, in step S220, the text processor 120 replaces each original pixel with a corresponding pixel array. The row amount of the corresponding pixel arrays is determined according to a gradient of a parallax barrier of the 3D display 200, and the column amount of the corresponding pixel arrays is determined according to a multi-view value of the 3D display 200. In the present embodiment, the 3D display 200 is assumed to be a 2-view display, and accordingly each original pixel is replaced with a pixel array having 2 columns. Referring to FIG. 3B, the original pixel 310 is replaced with a 3*2 pixel array 330, and the original pixel 320 is replaced with a 3*2 pixel array 340. In the present embodiment, the gradient of the parallax barrier of the 3D display 200 is assumed to be −3, and accordingly each original pixel is replaced with a pixel array having 3 rows. However, the present invention is not limited thereto, and in other embodiments, if the gradient of the parallax barrier of the 3D display 200 is +6 or −6, each original pixel is replaced with a pixel array having 6 rows in step S220. In another embodiment, the parallax barrier can be replaced by a lenticular screen and the row amount has the same relationship with the gradient of the lenticular screen as described above for the parallax barrier.

Referring to FIG. 2, in step S230, the text processor 120 obtains the color value of each original pixel in the original text. For example, as shown in FIG. 3A, the [red value, green value, blue value] of the original pixel 310 is [a, b, c], and the [red value, green value, blue value] of the original pixel 320 is [e, f, g]. In step S230, the color values of the corresponding pixel array are set according to the color value of the original pixel. As shown in FIG. 3B, a first side (for example, the left side) of the pixel array 330 has three edge pixels, and the color values of the three edge pixels are respectively [a, b, c], [x, b, c], and [x, x, c]. A second side (for example, the right side) of the pixel array 330 has three corresponding edge pixels, and the color values of the three corresponding edge pixels are respectively [x, x, x], [a, x, x], and [a, b, x]. Herein x is a predetermined value, and which may be any real number. In the present embodiment, the predetermined value x is 0. In another embodiment, the first side is the right side of the pixel array 330, and the second side is the left side of the pixel array 330. Or, the first side and the second side may also be the upper side and the lower side of the pixel array 330.

The color values of the edge pixels on the left side of the pixel array 330 in FIG. 3B are respectively [a, b, c], [0, b, c], and [0, 0, c] from top to bottom. However, the order of the edge pixels is not limited thereto, and in another embodiment, the color values of the edge pixels on the left side of the pixel array 330 may be respectively [0, 0, c], [0, b, c], and [a, b, c] or [0, b, c], [0, 0, c], and [a, b, c] from top to bottom or in other orders. The color values of the edge pixels on the left side of the pixel array 330 are complementary with the color values of the edge pixels on the right side of the pixel array 330. Namely, the sum of the color values of the edge pixels on the left side and the color values of the edge pixels on the right side should be close to the color value of the original pixel 310. For example, as shown in FIG. 3B, the color value of the first edge pixel on the left side of the pixel array 330 is [a, b, c], and the color value of the first edge pixel on the right side of the pixel array 330 should be [0, 0, 0] such that the sum of the color values of the two edge pixels is exactly equal to the color value [a, b, c] of the original pixel 310.

In step S230, the color values of the corresponding pixel arrays are set according to the color values of other original pixels in the original text, and the operation can be referred to foregoing description of the pixel array 330 therefore will not be described herein. For example, if the [red value, green value, blue value] of the original pixel 320 is [e, f, g], the color values of the three edge pixels on the first side (for example, the left side) of the pixel array 340 are respectively [e, f, g], [0, f, g], and [0, 0, g], and the color values of the three edge pixels on the second side (for example, the right side) of the pixel array 340 are respectively [0, 0, 0], [e, 0, 0], and [e, f, 0].

Thereafter, in step S240, the text processor 120 combines the edge pixels on adjoining sides of the first pixel array 330 and the second pixel array 340. The color value of the combined pixel is the sum of the color values of the corresponding two edge pixels. If the color values of two adjoining edge pixels are respectively [x, x, x] and [e, f, g], the color value of the combined pixel is [x+e, x+f, x+g]. As shown in FIG. 3B, the color values of the edge pixels on the adjoining side of the first pixel array 330 are respectively [0, 0, 0], [a, 0, 0], and [a, b, 0], and the color values of the edge pixels on the adjoining side of the second pixel array 340 are respectively [e, f, g], [0, f, g], and [0, 0, g]. Thus, the color values of the pixels in the combined column are respectively [e, f, g], [a, f, g], and [a, b, g], as shown in FIG. 3C.

Figure 4A:
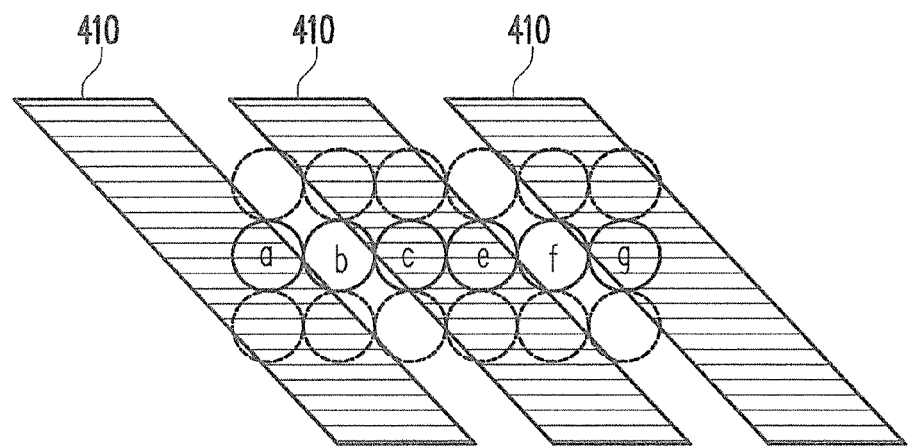
FIG. 4A illustrates how conventionally an original text is displayed in a 3D display.

FIG. 4A illustrates how conventionally an original text is displayed in the 3D display 200. The 3D display 200 has a parallax barrier 410 and a display panel. The display panel has a plurality of pixels, wherein each of the pixels is composed of a plurality of sub-pixels in different colors (as denoted by dotted-line circles and solid-line circles in FIG. 4A). The pixel composed of the sub-pixels a, b, and c in FIG. 4A represents the original pixel 310 having the color value [a, b, c] in FIG. 3A, and the pixel composed of the sub-pixels e, f, and g in FIG. 4A represents the original pixel 320 having the color value [e, f, g] in FIG. 3A. The parallax barrier 410 can block light entering some of the sub-pixels. Herein it is assumed that the sub-pixels a and e are red sub-pixels, the sub-pixels b and f are green sub-pixels, and the sub-pixels c and g are blue sub-pixels. It can be clearly understood from FIG. 4A that a user can only see the green sub-pixels b and f. Accordingly, color error is produced on the original pixels 310 and 320. The technique of multi-view autostereoscopic display apparatus reduces the resolution on both horizontal and vertical directions. Thus, some strokes of a word become invisible from a specific viewing angle when the display font is small (the width of each stroke is within three pixels).

Figure 4B:
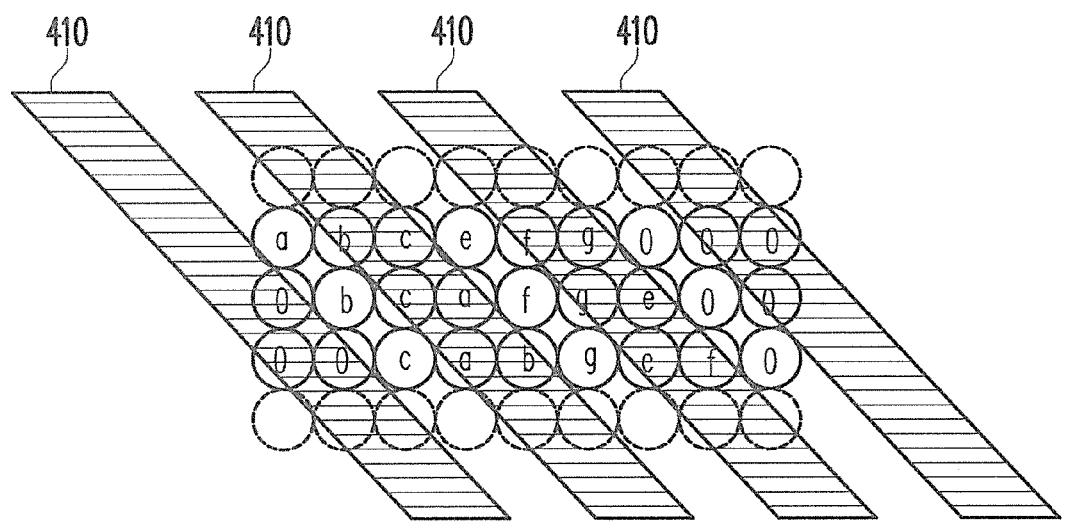
FIG. 4B illustrates how each pixel in FIG. 3C is displayed in a 3D display.

FIG. 4B illustrates how each pixel in FIG. 3C is displayed in the 3D display 200. The original pixels 310 and 320 are expanded into the pixel array in FIG. 3C, and after the pixel array is displayed in the 3D display 200, the color values of the sub-pixels are arranged as shown in FIG. 4B. It can be understood from FIG. 4B that the color value [a, b, c] of the original pixel 310 and the color value [e, f, g] of the original pixel 320 are not blocked by the parallax barrier 410 but can be correctly displayed in the 3D display 200.

Figure 5:
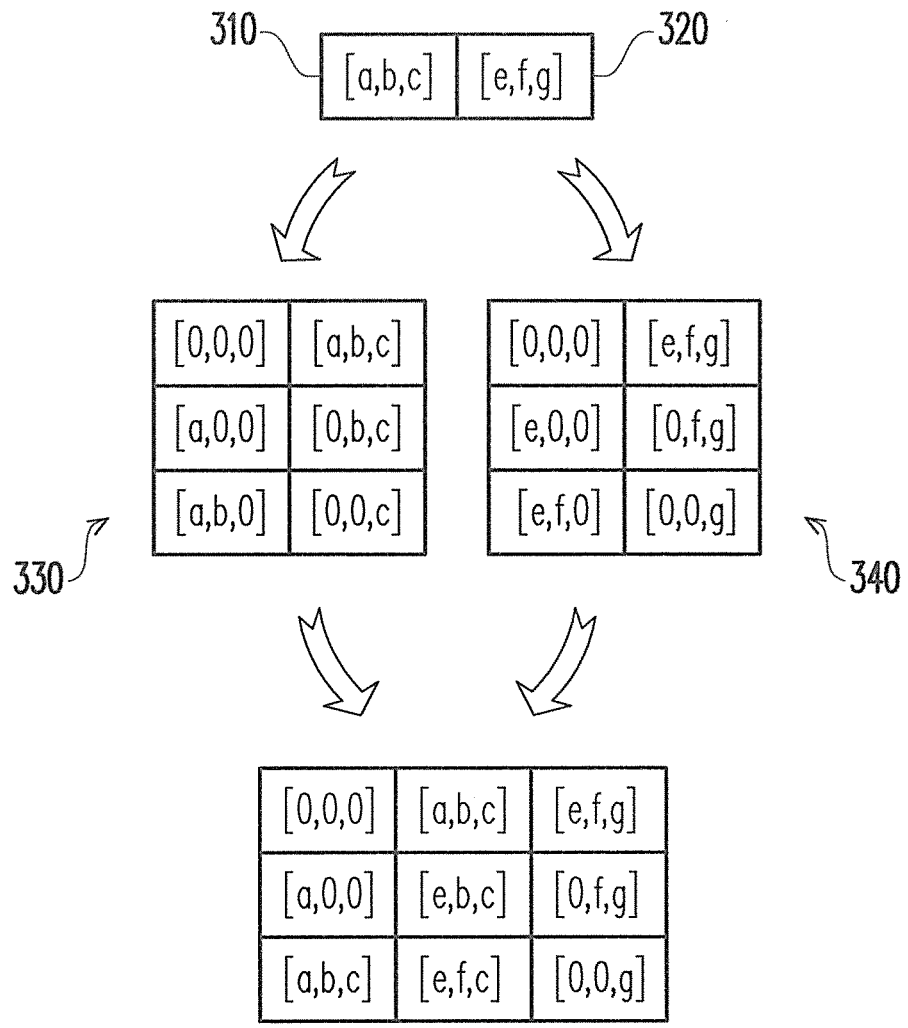
FIG. 5 illustrates how a text processor transforms an original text into an extensible text according to another embodiment of the present invention.

In the embodiment described above, the gradient of the parallax barrier 410 of the 3D display 200 is assumed to be −3 (i.e., the slit on the parallax barrier 410 inclines from top left to bottom right). If the gradient of the parallax barrier 410 of the 3D display 200 is +3 (i.e., the slit on the parallax barrier 410 inclines from top right to bottom left), the distribution of color values illustrated in FIG. 3B can be correspondingly adjusted. FIG. 5 illustrates how the text processor 120 transforms an original text into an extensible text according to another embodiment of the present invention. The transformation process illustrated in FIG. 5 is similar to that illustrated in FIGS. 3A-3C, therefore will not be described herein. The difference between the two transformation processes is that in FIG. 5, the color values of the three edge pixels on the left side of the pixel array 330 are respectively [0, 0, 0], [a, 0, 0], and [a, b, 0], and the color values of the three edge pixels on the right side of the pixel array 330 are respectively [a, b, c], [0, b, c], and [0, 0, c]. Besides, the transformation process illustrated in FIG. 5 can use a lenticular screen to replace the parallax barrier 410.

In addition, in the embodiment illustrated in FIGS. 3A-3C, the 3D display 200 is assumed to be a 2-view display, and accordingly each original pixel is replaced with a pixel array having 2 columns. However, the present invention is not limited thereto, and in other embodiments, if the 3D display 200 is a 2-view or 3-view display, each original pixel is replaced with a pixel array having 2 columns. If the 3D display 200 is a 4-view, 5-view, or 6-view display, each original pixel is replaced with a pixel array having 3 columns. If the 3D display 200 is a 7-view, 8-view, or 9-view display, each original pixel is replaced with a pixel array having 4 columns. If the 3D display 200 is a 16- to 18-view display, each original pixel is replaced with a pixel array having 7 columns. The size of the pixel array illustrated in FIG. 3B can be correspondingly adjusted according to a multi-view value of the 3D display 200. For example, in the pixel array 330 (or 340), some middle pixels may further exist between the first side (for example, the left side) and the second side (for example, the right side), and the column number of the middle pixels is determined according to the number of viewing angles of the 3D display 200.

Figure 6:
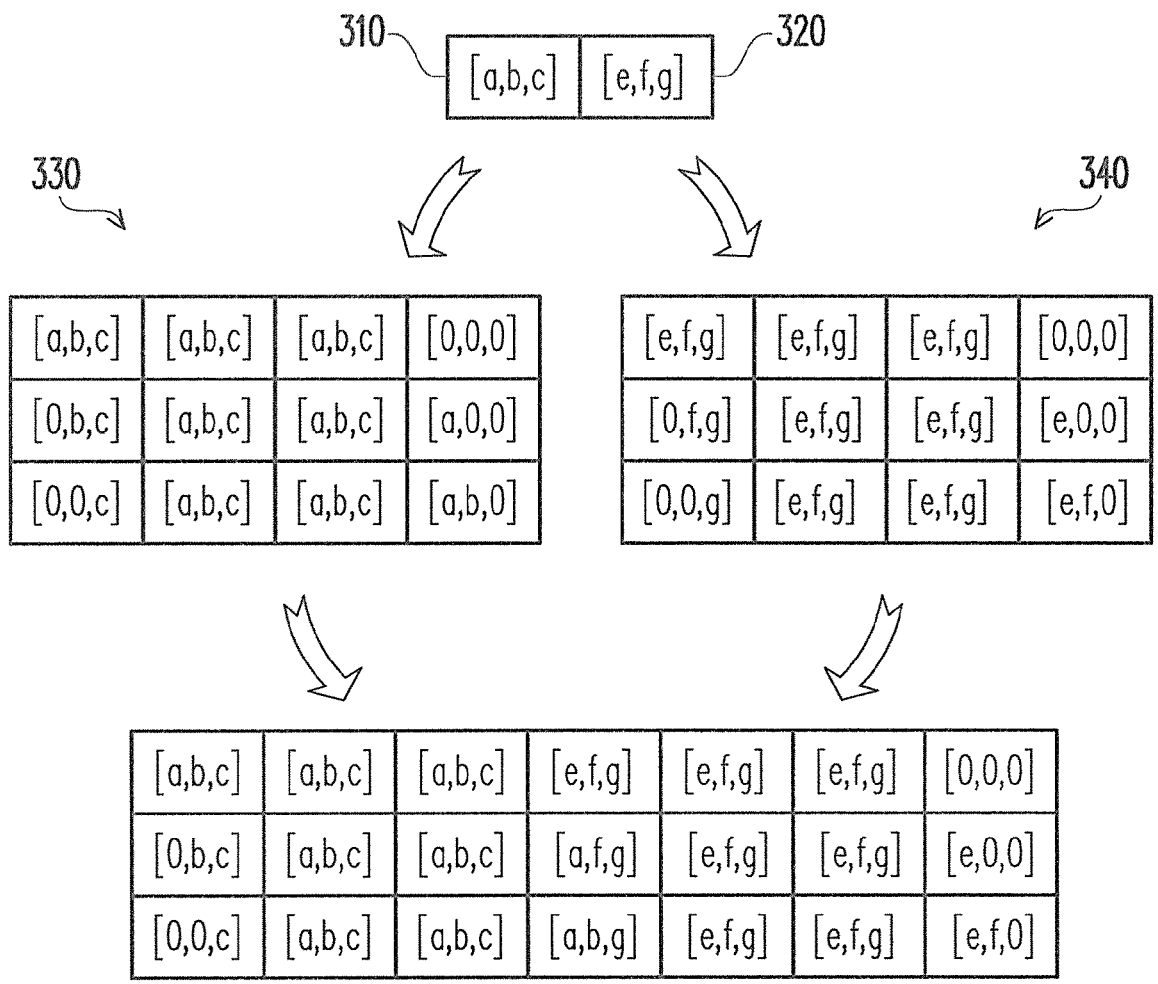
FIG. 6 illustrates how a text processor transforms an original text into an extensible text according to yet another embodiment of the present invention.

FIG. 6 illustrates how the text processor 120 transforms an original text into an extensible text according to yet another embodiment of the present invention. The transformation process illustrated in FIG. 6 is similar to that illustrated in FIGS. 3A-3C, therefore will not be described herein. The difference between the two transformation processes is that in FIG. 6, the pixel arrays 330 and 340 are 3*4 pixel arrays. Namely, in the pixel array 330 (or 340) illustrated in FIG. 6, there are two columns of middle pixels between the left side and the right side. The 3*4 pixel array 330 (or 340) illustrated in FIG. 6 is applicable to a 7- to 9-view 3D display 200. The color values of the middle pixels are the same as those of the corresponding original pixels. For example, the color values of the middle pixels in the pixel array 330 are the same as the color value [a, b, c] of the original pixel 310, and the color values of the middle pixels in the pixel array 340 are the same as the color value [e, f, g] of the original pixel 320.

As described above, the technique of multi-view autostereoscopic display apparatus reduces the resolution in both the horizontal and vertical directions. In the present embodiment, this problem is resolved by increasing the number of unit pixels in the display font. If the resolution in the horizontal and vertical direction is reduced to 1/n of its original value, n times of the original number of unit pixels have to be displayed in the horizontal and vertical direction in order to ensure that each stroke can be seen from every viewing angle. Regardless of whether the multi-view autostereoscopic display apparatus adopts a parallax barrier or a lenticular screen, a satisfactory text display quality can be achieved in the present embodiment without changing the optical structure of the multi-view autostereoscopic display apparatus.

In some applications, the pixel data transformation method in each embodiment described above may also be implemented as a computer program product, and the computer program may be stored in a computer readable storage medium or transmitted through a network. The pixel data transformation method described above is executed when the computer program is loaded into a computer and executed by the same.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pixel data transformation method of a three dimensional (3D) display, comprising:
   obtaining a color value of a first original pixel;
   replacing the first original pixel with a first pixel array according to the color value of the first original pixel by using a text processor;
   obtaining a color value of a second original pixel, wherein the second original pixel is adjacent to the first original pixel;
   replacing the second original pixel with a second pixel array according to the color value of the second original pixel; and
   combining edge pixels on adjoining sides of the first pixel array and the second pixel array, wherein a color value of each of the combined pixels is a sum of color values of the two corresponding edge pixels on adjoining sides of the first pixel array and the second pixel array,
   wherein row amount of the first and the second pixel arrays is determined according to a gradient of an image splitter of the 3D display.

2. The pixel data transformation method according to claim 1, wherein the color value of the first original pixel is [a, b, c], a first side of the first pixel array has three edge pixels, color values of the three edge pixels are respectively [a, b, c], [x, b, c], and [x, x, c], a second side of the first pixel array has three corresponding edge pixels, color values of the three corresponding edge pixels are respectively [x, x, x], [a, x, x], and [a, b, x], and x is a predetermined value.

3. The pixel data transformation method according to claim 2, wherein the predetermined value x is 0.

4. The pixel data transformation method according to claim 2, wherein the color value [a, b, c] is [red value, green value, blue value].

5. The pixel data transformation method according to claim 2, wherein the first side is a left side of the first pixel array, and the second side is a right side of the first pixel array.

6. The pixel data transformation method according to claim 2, wherein the first side is a right side of the first pixel array, and the second side is a left side of the first pixel array.

7. The pixel data transformation method according to claim 2, wherein a plurality of middle pixels exist between the first side and the second side of the first pixel array according to a multi-view value of the 3D display, and a plurality of middle pixels exists between the left side and the right side of the second pixel array according to the multi-view value of the 3D display.

8. The pixel data transformation method according to claim 7, wherein the middle pixels of the first pixel array have a color value [a, b, c].

9. The pixel data transformation method according to claim 7, wherein when the multi-view value is 2 or 3, a column amount of the first and the second pixel arrays are 2, when the multi-view value is 4, 5 or 6, the column amount of the first and the second pixel arrays are 3, when the multi-view value is 7, 8 or 9, the column amount of the first and the second pixel arrays are 4, when the multi-view value is 16, 17 or 18, the column amount of the first and the second pixel arrays are 7.

10. The pixel data transformation method according to claim 1, wherein the image splitter comprises a parallax barrier or a lenticular screen.

11. A computer program stored on a non-transitory computer-readable medium for pixel data transformation of a 3D display, wherein when a computer loads and executes the computer program, the computer program executes the pixel data transformation method according to claim 1.

12. A 3D video data processing apparatus, comprising:
   a 3D video processor, for providing a 3D video frame;
   a text processor, transforming an original text into an extensible text, wherein color values of a first original pixel and a second original pixel in the original text is obtained, the second original pixel is adjacent to the first original pixel, the first original pixel is replaced with a first pixel array according to the color value of the first original pixel, the second original pixel is replaced with a second pixel array according to the color value of the second original pixel, edge pixels on adjoining sides of the first pixel array and the second pixel array are combined, and a color value of each of the combined pixels is a sum of color values of the two corresponding edge pixels on adjoining sides of the first pixel array and the second pixel array; and
   a combination circuit, respectively coupled to the 3D video processor and the text processor, wherein the combination circuit combines the extensible text provided by the text processor into the 3D video frame output by the 3D video processor,
   wherein row amount of the first and the second pixel arrays is determined according to a gradient of an image splitter of the 3D display.

13. The 3D video data processing apparatus according to claim 12, wherein the color value of the first original pixel is [a, b, c], a first side of the first pixel array has three edge pixels, the color values of the three edge pixels are respectively [a, b, c], [x, b, c], and [x, x, c], a second side of the first pixel array has three corresponding edge pixels, the color values of the three corresponding edge pixels are respectively [x, x, x], [a, x, x], and [a, b, x], and x is a predetermined value.

14. The 3D video data processing apparatus according to claim 13, wherein the predetermined value x is 0.

15. The 3D video data processing apparatus according to claim 13, wherein the color value [a, b, c] is [red value, green value, blue value].

16. The 3D video data processing apparatus according to claim 13, wherein the first side is a left side of the first pixel array, and the second side is a right side of the first pixel array.

17. The 3D video data processing apparatus according to claim 13, wherein the first side is a right side of the first pixel array, and the second side is a left side of the first pixel array.

18. The 3D video data processing apparatus according to claim 13, wherein a plurality of middle pixels exist between the first side and the second side of the first pixel array according to a multi-view value of the 3D display, and a plurality of middle pixels exists between the left side and the right side of the second pixel array according to the multi-view value of the 3D display.

19. The 3D video data processing apparatus according to claim 18, wherein the middle pixels of the first pixel array have a color value [a, b, c].

20. The 3D video data processing apparatus according to claim 17, wherein when the multi-view value is 2 or 3, a column amount of the first and the second pixel arrays are 2, when the multi-view value is 4, 5 or 6, the column amount of the first and the second pixel arrays are 3, when the multi-view value is 7, 8 or 9, the column amount of the first and the second pixel arrays are 4, when the multi-view value is 16, 17 or 18, the column amount of the first and the second pixel arrays are 7.

21. The 3D video data processing apparatus according to claim 12, wherein the image splitter comprises a parallax barrier or a lenticular screen.

* * * * *